United States Patent
Passe et al.

(10) Patent No.: US 10,249,202 B1
(45) Date of Patent: Apr. 2, 2019

(54) DETECTION AND INTERDICTION OF DRONES WITH RESPECT TO CONTROLLED-ENVIRONMENT FACILITIES

(71) Applicant: Securus Technologies, Inc., Dallas, TX (US)

(72) Inventors: Scott Passe, Forney, TX (US); Luke Keiser, Frisco, TX (US)

(73) Assignee: Securus Technologies, Inc., Carrollton, TX (US)

( * ) Notice: Subject to any disclaimer, the term of this patent is extended or adjusted under 35 U.S.C. 154(b) by 345 days.

(21) Appl. No.: 14/939,793

(22) Filed: Nov. 12, 2015

(51) Int. Cl.
| | |
|---|---|
| *G08G 5/00* | (2006.01) |
| *B64C 39/02* | (2006.01) |
| *H04W 4/02* | (2018.01) |
| *G05D 1/00* | (2006.01) |
| *H04K 3/00* | (2006.01) |

(52) U.S. Cl.
CPC ......... *G08G 5/0082* (2013.01); *G05D 1/0011* (2013.01); *H04K 3/92* (2013.01)

(58) Field of Classification Search
CPC ............ B64C 39/024; B64C 2201/141; B64C 2201/146; B64C 2201/027; B64C 2201/042; B64C 2201/12; B64C 2201/122; B64C 2201/123; B64C 2201/128; B64C 2201/148; G08G 5/0069; G08G 5/006; G08G 5/0039
See application file for complete search history.

(56) References Cited

U.S. PATENT DOCUMENTS

| | | | | |
|---|---|---|---|---|
| 9,529,360 | B1* | 12/2016 | Melamed | G05D 1/0022 |
| 2016/0274578 | A1* | 9/2016 | Arwine | G05D 1/0011 |
| 2016/0330771 | A1* | 11/2016 | Tan | H04W 16/14 |
| 2017/0092138 | A1* | 3/2017 | Trundle | B64C 39/024 |
| 2017/0169713 | A1* | 6/2017 | Gong | G08G 5/006 |

* cited by examiner

*Primary Examiner* — Jerrah Edwards
*Assistant Examiner* — Matthew Franklin Gordon
(74) *Attorney, Agent, or Firm* — Fogarty LLP

(57) ABSTRACT

Systems and methods for detection and interdiction of drone vehicles with respect to controlled-environment facilities may monitor electromagnetic signals originating within or transiting operational boundaries associated with a controlled-environment facility, receive the electromagnetic signals originating within or transiting the operational boundaries associated with the controlled-environment facility, and analyze the received electromagnetic signals to determine if the received electromagnetic signals are controlling or associated with a drone. This monitoring may be carried-out by a software-defined radio associated with a central access point of a wireless communications managed access system of the controlled-environment facility and the electromagnetic signals may be received by the software-defined radio of the managed access system (central access point). Responding to the drone controlled by the drone control signals may include monitoring the drone control signals, alerting authorities to the drone, jamming the drone control signals, co-opting control of the drone, and/or the like.

29 Claims, 3 Drawing Sheets

DETECTION AND INTERDICTION OF DRONES WITH RESPECT TO CONTROLLED-ENVIRONMENT FACILITIES

TECHNICAL FIELD

The present disclosure relates generally to controlled-environment facilities, more particularly to drone vehicles with respect to controlled-environment facilities, and specifically to detection and interdiction of drones with respect to controlled-environment facilities.

BACKGROUND

So-call drone aircraft, and other remote controlled vehicles have proliferated in recent years. Such small scale, private unmanned vehicles, including Unmanned Aerial Vehicles (UAVs), commonly referred to as "drones," are typically controlled using radio frequency devices such as cell phones, tablet computing devices, dedicated control devices, or the like. For example, tablet computing devices or smartphones may employ an application program (app) to provide such control, employing the (Wi-Fi) radio and/or Global Positioning System (GPS) functionality of the cell phone or tablet computing device to transmit signals to the drone and using the screen of the device to provide feedback to the user. Drone vehicles, particularly drone aircraft, have been known to be used to deliver contraband such as drugs, cell phones, weapons, pornography, and the like to residents of controlled-environment facilities, such as prisoners in correctional institutions.

SUMMARY

The present invention is directed to systems and methods which provide for detection and interdiction of drones with respect to controlled-environment facilities, which may monitor electromagnetic signals originating within or transiting operational boundaries associated with a controlled-environment facility, receive the electromagnetic signals originating within or transiting the operational boundaries associated with the controlled-environment facility, and analyze the received electromagnetic signals to determine if the received electromagnetic signals are controlling or associated with a drone. This monitoring may be carried-out by a software-defined radio associated with a central access point of a wireless communications managed access system of the controlled-environment facility and the electromagnetic signals may be received by the software-defined radio of the managed access system (central access point). Further, this monitoring and receiving of electromagnetic signals may be carried out in radio frequency bands capable of controlling drones. The operational boundaries associated with the controlled-environment facility may extend beyond property boundaries of the controlled-environment facility, and/or the electromagnetic signals originate from a predefined area extending beyond the operational boundaries associated with the controlled-environment facility. The present systems and methods may further determine whether the received and monitored electromagnetic signals are directing the drone toward the controlled-environment facility.

Responding to the drone controlled by the drone control signals may include monitoring the drone control signals, alerting authorities to the drone, jamming the drone control signals, co-opting control of the drone, and/or the like.

Hence, a controlled-environment facility counter-drone detection (and interdiction) system may employ a central access point configured to receive and monitor electromagnetic signals from within a boundary associated with a controlled-environment facility. This central access point may be a central access point of a wireless communications managed access system of the controlled-environment facility and the electromagnetic signals may be received by a software-defined radio associated with the managed access system central access point tuned to monitor for drone control signals. These electromagnetic signals may be radio frequency signals in a band capable of controlling a drone, in a band associated with drones, in a band licensed for controlling drones, etc. The monitored boundaries associated with the controlled-environment facility may extend beyond property boundaries of the controlled-environment facility. However, still, the central access point may receive and monitor electromagnetic signals originating from a predefined area extending beyond the boundaries associated with the controlled-environment facility.

An analysis module may determine if received and monitored electromagnetic signals are controlling or are associated with a drone. The analysis module may further determine whether the received and monitored electromagnetic signals are directing the drone toward the controlled-environment facility.

A drone response module may take drone countermeasures in response to the analysis module determining that received and monitored electromagnetic signals are drone control signals. For example, such drone countermeasures may include alerting authorities to a drone that is in the vicinity of the controlled-environment facility, approaching the controlled-environment facility, and/or over the controlled-environment facility. Additionally or alternatively, the drone countermeasures may include monitoring the drone control signals, jamming the drone control signals, co-opting control of the drone, etc.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein. In these and other various embodiments, program instructions may, upon execution by a controlled-environment facility wireless communications managed access system, and/or one or more associated computer systems, cause the controlled-environment facility wireless communications managed access system and/or the one or more associated computer systems to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
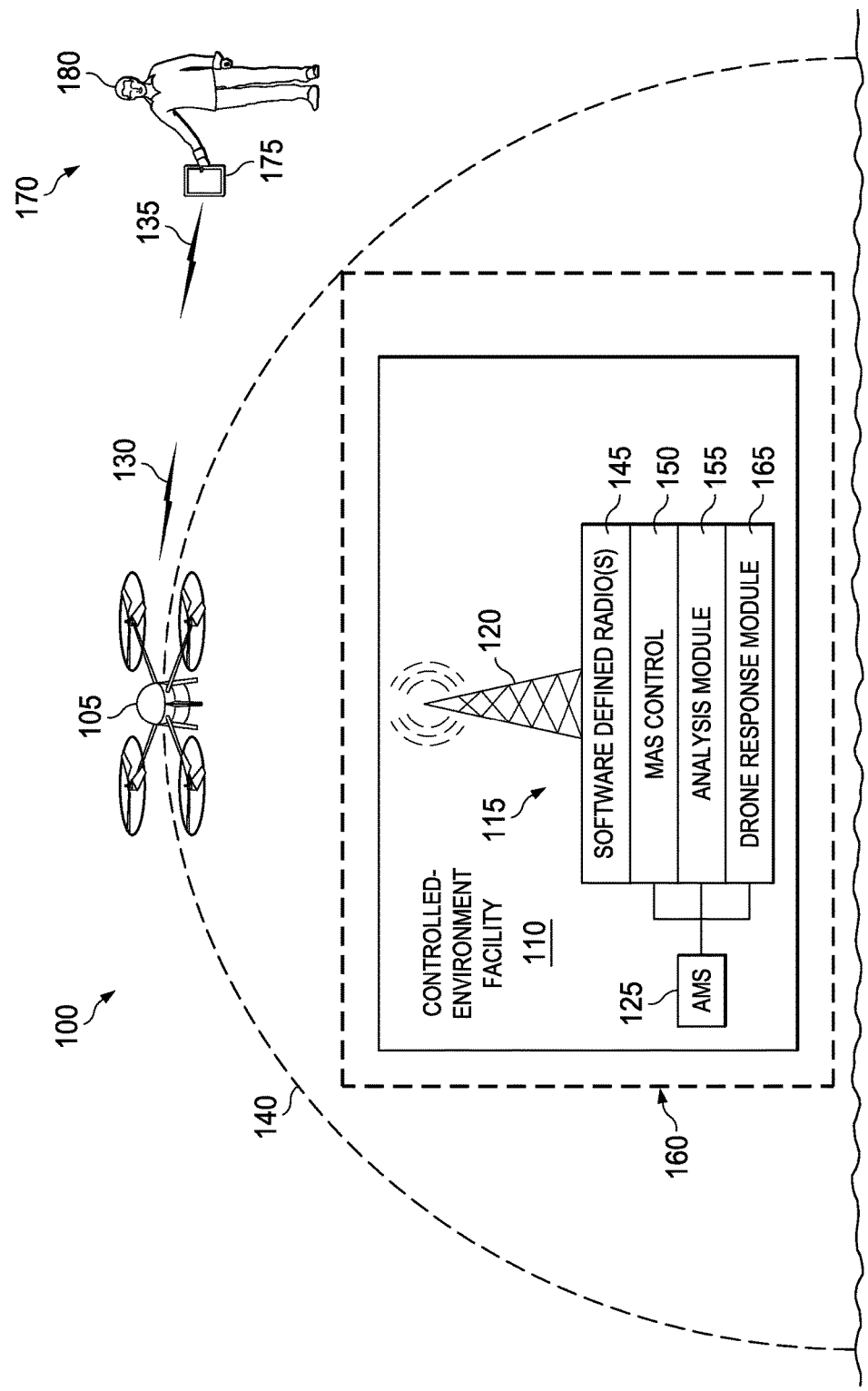
Figure 2:
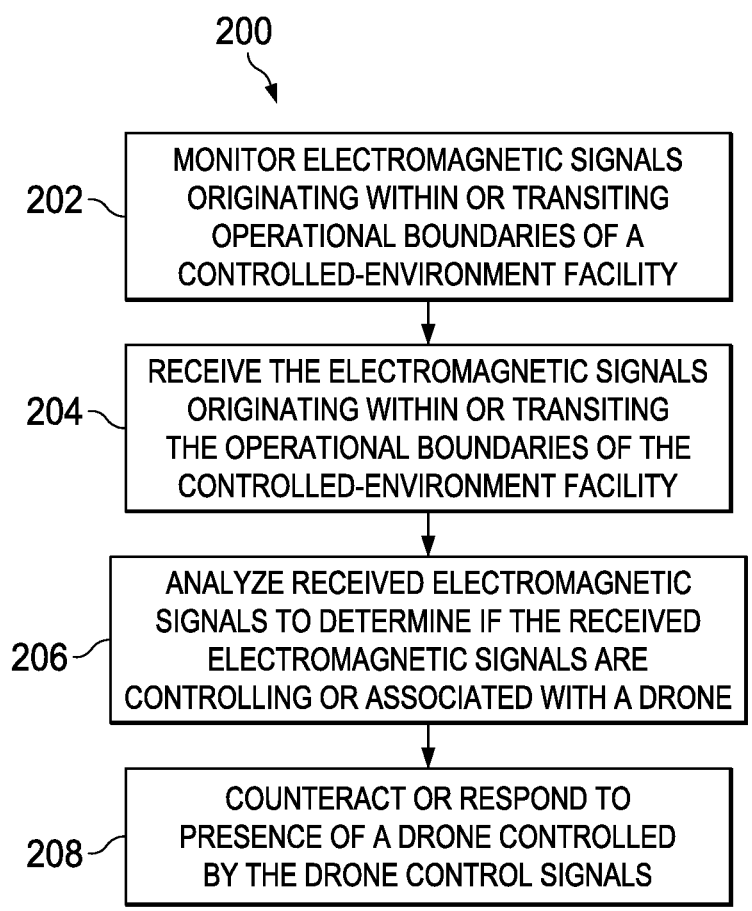
Figure 3:
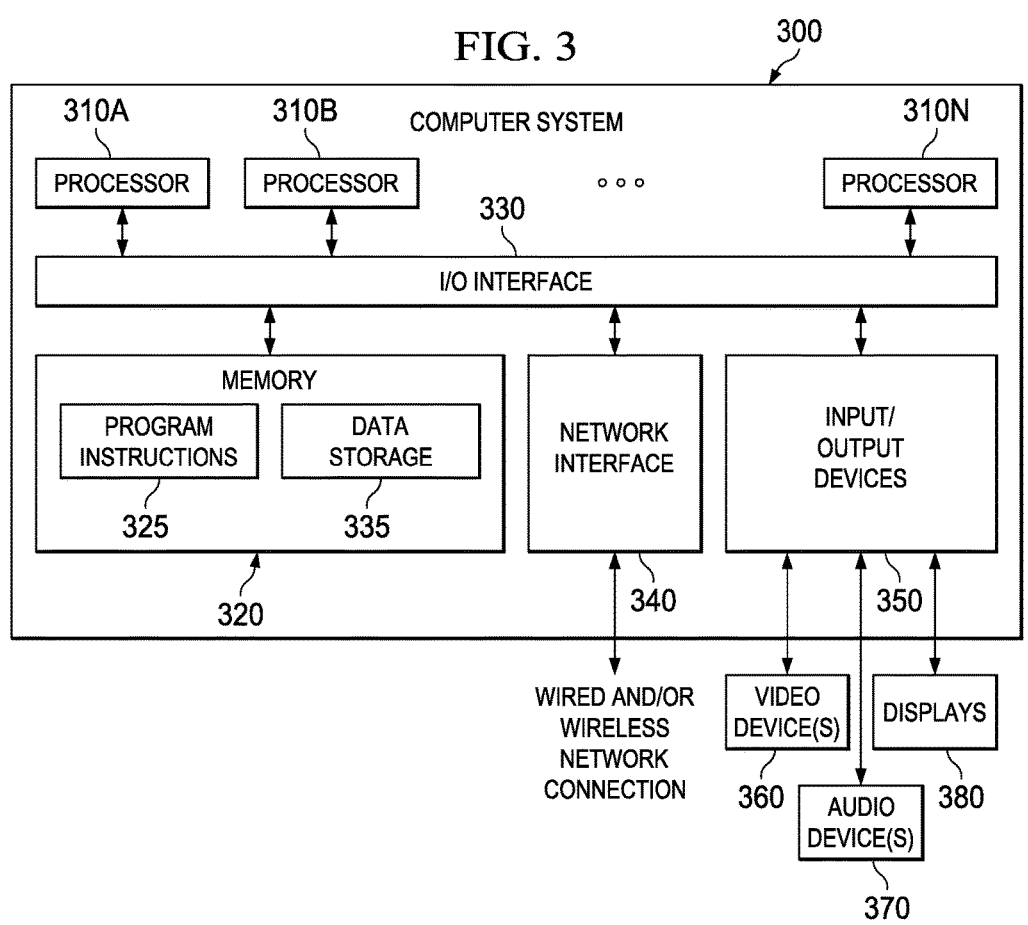

Having thus described the invention in general terms, reference will now be made to the accompanying drawings, which are not necessarily drawn to scale, and wherein:

FIG. 1 is a diagrammatic illustration of an example controlled-environment facility related environment, wherein an example of the present systems and methods for detection and interdiction of drones with respect to controlled-environment facilities is shown deployed, in accordance with some embodiments;

FIG. 2 is a flowchart of an example implementation of a process for detection and interdiction of drones with respect to controlled-environment facilities, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods, relate generally to controlled-environment facilities, more particularly to drone vehicles with respect to such controlled-environment facilities, and specifically to detection and interdiction of drones with respect to controlled-environment facilities. In accordance with such embodiments of the present systems and methods, electromagnetic signals originating within or transiting operational boundaries associated with a controlled-environment facility may be monitored, electromagnetic signals originating within or transiting the operational boundaries associated with the controlled-environment facility may be received, and the received electromagnetic signals may be analyzed to determine if the received electromagnetic signals are controlling or associated with a drone. This monitoring may be carried-out by a software-defined radio associated with a central access point of a wireless communications managed access system of the controlled-environment facility and the electromagnetic signals may be received by the software-defined radio of the managed access system (central access point). Responding to the drone controlled by the drone control signals may include monitoring the drone control signals, alerting authorities to the drone, jamming the drone control signals, co-opting control of the drone, and/or the like.

Hence, various embodiments of the present systems and methods are directed to electronic hardware and software systems that detect the presence of radio frequency transmissions associated with the control of remotely operated vehicles, such as Unmanned Aerial Vehicles (UAVs), remote controlled land vehicles, remote controlled dirigible-like vehicles, remote controlled watercraft or submersibles, and/or any type of remote controlled vehicle capable of travel in the air, on land or by water, generally referred to herein as "drones." Such electronic hardware and software systems detect the presence of radio frequency transmissions associated with the control of remotely operated vehicles that enter the proximity of a controlled-environment facility. Upon detection of a signal deemed to be emitted by the drone or its associated remote control device, the present systems and methods may: alert the controlled environment facility of the proximal presence of a drone; scramble the control signaling between the remote control device and the drone, thereby interrupting and/or terminating its movement; take over control of the drone to allow an automated or human-controlled takeover of the drone's path; gather electronic forensic evidence for further investigation and/or prosecution of the operator(s) of the drone; advertise or advise that the area surrounding the controlled environment facility is a restricted zone to the drone controller; and/or the like. Thereby, embodiments of the present systems and methods may be used to establish "no-fly" zones, "no-go" zones, or the like, for drones, over, in and around controlled-environment facilities.

FIG. 1 is a diagrammatic illustration of example controlled-environment facility related environment 100, wherein an example of the present systems and methods for detection and interdiction of drones with respect to controlled-environment facilities is shown deployed, in accordance with some embodiments. While FIG. 1 depicts a UAV (drone) aircraft, such as the illustrated quadcopter, it will be appreciated that the illustrated drone aircraft is shown for purposes of illustration and explanation of an example embodiment of the present systems and methods, and drone 105 may be, as discussed above, any type of remote controlled vehicle capable of travel in the air, on land or by water.

In accordance with embodiments of the present systems and methods, controlled-environment facility 110 may employ a controlled-environment facility wireless communications Managed Access System (MAS) 115. MAS 115 may be a permanent system installed in or in conjunction with subject controlled-environment facility 110, or may be temporary. MAS hardware employs antennas and the like, to continuously monitor communications devices operating in the controlled-environment facility, collecting communications device data, such as IMEI/MEIDs, numbers dialed or texted-to, and/or the like. MAS may generally act as a cell site at/for controlled-environment facility 110, in some embodiments. MAS 115 may be employed in some controlled-environment facility to intercept and manage communications attempted by contraband wireless communications devices (e.g. smuggled-in cell phones, etc.). Such a MAS may employ (central) cellular data access point 120 (i.e. a cellular antenna). For example, dedicated cellular data access point 120 may be placed within (e.g. in or near a center of controlled-environment facility 110, as illustrated in FIG. 1), or at least near enough to controlled-environment facility 110, such that all wireless communications devices within the facility, including contraband communications devices, identify cellular data access point 120 as the primary base station for the communications cell. In certain embodiments, the power levels and/or antenna beam directionality associated with cellular data access point 120 may be adjusted such that the geographical area of the communications cell corresponds with the area of controlled-environment facility 110. Thus, all cellular communications originating from within controlled-environment facility 110 may be directed through MAS 115 or another embodiment of a communications interception device, such as a central controlled-environment facility communications processing system. MAS 115 may control communication from and to contraband communications devices without impacting legitimate wireless communications (such as by controlled-environment facility staff wireless communications devices, approved communications devices, or the like) or within designated areas of controlled-environment facility 110. Such a MAS may be a combination of a specially managed cellular telephone system network and a tightly controlled distributed antenna system, central antenna 120, or the like. MAS 115 may employ 2G, 3G, 4G and 5G technologies and protocols used by wireless cellphone carriers. MAS 115 may apply policy rules determined by facility administrators, which may be administered by controlled-environment facility Administration and Management System (AMS) 125 (which may be referred to as a Jail Management System (JMS), in a correctional institution implementation). In accordance with embodiments of the present systems and methods, MAS 115 may capture drone and drone control transmissions 130 and 135, as well as contraband communications data such as contraband communications device IMEI or MEID, phone numbers dialed or messaged, and/or the like.

In environment 100 an implementation for drone interdiction and/or drone detection may make use of a central access point such as MAS central access point 120, which may in accordance with embodiments of the present systems and methods, be configured to receive and monitor electromagnetic signals from within operational boundaries 140 associated with controlled-environment facility 110, such as through manipulation of central access point power/sensitivity levels, antennae beam directionality, and the like. Thusly, in accordance with embodiments of the present systems and methods, central access point 120 of wireless communications managed access system 115 of controlled-environment facility 110 may receive electromagnetic signals using the very broad frequency range of digital signal processor-based software-defined radio(s) 145 of managed access system central access point 120 tuned to monitor for drone and/or drone control signals 130 and/or 135.

Typically, AMS 125 may provide for administration of the controlled-environment facility and its residents such as through storage and administration of resident-related data. In accordance with various embodiments of the present systems and methods, such as illustrated in FIG. 1, MAS control 150, and/or associated AMS 125, may include analysis module 155 for determining if received and monitored electromagnetic signals are controlling a drone (105), may contain drone control signals (135) and/or may be from a drone (130). Such monitored electromagnetic signals to be analyzed are preferably radio frequency signals in a band capable of controlling drones, such as radio frequency signals in a band associated with controlling drones (e.g. Wi-Fi), licensed for controlling drones, etc.

Operational boundaries 140 of controlled-environment facility 110 may, as illustrated, extend beyond property boundaries 160 of the controlled-environment facility. Additionally or alternatively, central access point 120 may be configured to receive and/or monitor electromagnetic signals originating from, or transiting, a predefined area extending beyond property boundaries 160 of controlled-environment facility 110 and/or beyond operational boundaries 140 of controlled-environment facility 110, such as to detect approaching drones 105. Hence, analysis module 155 may determine as part of its analysis, whether the received and monitored electromagnetic signals are directing drone (aircraft) 105 toward controlled-environment facility 110, as shown.

Drone response module 165, which may be a part of, or implemented by, MAS control 150 and/or AMS 125, may be configured to take drone interdiction measures (i.e. drone countermeasures) in response to analysis module 155 determining that received and monitored electromagnetic signals are drone control signals 130 and/or 135. These drone countermeasures may include alerting authorities to a drone in the vicinity of controlled-environment facility 110, a drone approaching the controlled-environment facility (as illustrated), a drone already over and/or within operational area 140, property boundaries 160, or controlled-environment facility 110 itself, and/or the like. Additional or alternative drone countermeasures or responses may include jamming drone signals 130 and/or control signals 135, co-opting control of drone 105, monitoring the drone and control signals 130 and 135 for actionable intelligence, and/or the like.

Hence software, firmware programming, or the like, may be used to employ a(n) (existing) controlled-environment facility managed wireless communication access system (e.g. MAS 115) as a drone detection and interdiction system, in accordance with embodiments of the present systems and methods. Such software, firmware or other programming may exist beside typical managed wireless communication functionality of MAS 115. MAS 115 may, in accordance with such embodiments, monitor electromagnetic signals, in frequency bands capable of controlling drones, that are originating within, or transiting, operational boundaries 140 associated with controlled-environment facility 110 using software-defined radio(s) 145 of MAS central access point 120. The electromagnetic signals in the frequency bands capable of controlling drones originating within, or transiting, operational boundaries 140 associated with controlled-environment facility 110 may thereby be received by software-defined radio(s) 145 of central access point 120 in such embodiments for further analysis, such as by MAS control 150 and/or AMS 125, in such embodiments, to determine if the received electromagnetic signals 135 are controlling a drone (105), such as to direct drone 105 toward controlled-environment facility 110. Further, such embodiments may employ MAS and/or AMS, functionality to counteract and/or respond to drone 105 being controlled by such captured drone control signals. Such programmed counteraction or response may include alerting authorities to drone 105 in the vicinity of controlled-environment facility 110, approaching the controlled-environment facility, over the controlled-environment facility, and/or the like. Other counteractions or responses MAS 115 and/or AMS 125 may be programmed to carry out may include emitting one or more signals to jam the drone control signals (130 and/or 135), transmitting one or more signals to co-opt control of the drone (105), monitoring the drone control signals (130 and/or 135) and/or the like. Such monitoring may be for investigative purposes, such as to identify location 170 from which drone 105 is being controlled, and/or device 175 being used to control drone 105, so as to facilitate apprehension of operator 180 of drone 105.

FIG. 2 is a flowchart of example implementation 200 of a process for detection and interdiction of drones with respect to controlled-environment facilities, in accordance with some embodiments of the present systems and methods. Therein, electromagnetic signals originating within or transiting operational boundaries (140) associated with a controlled-environment facility (110) are monitored at 202. These operational boundaries of the controlled-environment facility may extend beyond property boundaries of the controlled-environment facility, as discussed above. Additionally or alternatively, the electromagnetic signals may originate from a predefined area extending beyond the "operational" boundaries of the controlled-environment facility, and these signals may be monitored so as to detect drones (105) approaching the controlled-environment facility to carry out prohibited activity.

At 204 such electromagnetic signals originating within, or transiting, operational boundaries (140) associated with the controlled-environment facility are received and analyzed at 206 to determine if the received electromagnetic signals are drone or drone control signals (130 and 135, respectively) and/or are otherwise controlling a drone (105). The monitoring and/or receiving of the electromagnetic signals may be carried-out by a software-defined radio (145) of a central access point (120). Such a central access point may, as noted, be part of a wireless communications managed access system (115) for the controlled-environment facility (110). Further, such monitoring and receiving of electromagnetic signals may be carried out in radio frequency bands capable of controlling drones, such as bands licensed for such control and/or bands with a frequency response compatible with real time control of drones. Further, the analysis at 206 may determine whether the received and monitored electromagnetic signals are directing the drone (105) toward the controlled-environment facility (110), such as by analyzing the content of the signals themselves, and/or analyzing characteristics of the signals (or reply signals from the drone) such as for Doppler shift, or the like.

At 208 countermeasures may be taken, such as by, or in conjunction with, the managed access system (115, control 150). Such countermeasures may comprise counteracting or responding to the presence of a drone controlled by detected drone control signals. Such counteraction or response may include alerting authorities to a drone that is in the vicinity of the controlled-environment facility, alerting authorities that a drone is approaching the controlled-environment facility, alerting authorities that a drone is already over the controlled-environment facility, and/or the like. Such alerts may afford authorities (e.g. controlled-environment facility personnel, correctional officers, law enforcement, or the like) an opportunity to take action, from monitoring the drone, up to, and including, shooting down or otherwise destroying a threating otherwise dangerous UAV or other drone. Other countermeasures that may be taken rather than alerting authorities and/or in conjunction therewith, may include jamming the drone control signals, such as by transmitting or emitting high power signals on the same frequencies as being used to control the drone, to the extent permitted in accordance with communications regulations (for such purposes), such as within the property boundaries (160) of, or within the confines of, the controlled-environment facility (110). Additionally or alternatively, counteracting the drone further may be carried out by co-opting control of the drone, such as for redirecting the drone, at least temporarily, and/or repeatedly, away from the controlled-environment facility. In such a scenario, each time the drone to within a certain distance of (the airspace over) the controlled-environment facility, the MAS may transmit a signal that directs the drone to turn away, and/or about. Thereby, the present systems and methods may be used to "geofence" the subject controlled-environment facility, with respect to drones. However, in accordance with some embodiments of the present systems and methods, responding to the drone may include (only) scrutinizing and examining the drone control signals to gather electronic forensic evidence. Such collected information and evidence may be used for investigative purposes, such as to identify the location (170) from where the drone is being controlled and/or the device (175) being used to control the drone, so as to facilitate apprehension of the operator (180). In such regard, the drone may be allowed to continue on its course for purposes of gathering evidence and/or further intelligence, such as the drone's cargo, the cargo's intended recipient(s) (i.e. controlled-environment facility resident recipient(s)), etc.

Embodiments of the present systems and methods for detection and interdiction of drones with respect to controlled-environment facilities, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 (and/or the like) described above with respect to FIG. 2, and/or a computer system such as computer system 300 may be used as, or as part of, one or more of controlled environment facility wireless communication managed access system 115 (control 150 and/or software-defined radio(s) 145), to implement analysis module 155 and/or response module 165, AMS 125 and/or even as drone controller 175, etc. In various embodiments two or more of these computer systems may be configured to communicate with each other in any suitable way, such as, for example, via a network, such as via a local area network, and/or using wireless (Wi-Fi) functionality.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility counter-drone detection system comprising:
    a central access point configured to receive and monitor electromagnetic signals from within a boundary associated with a controlled-environment facility; and
    an analysis module for determining if received and monitored electromagnetic signals are originating from or are controlling a drone toward the controlled-environment facility.

2. The system of claim 1, wherein the central access point is a central access point of a wireless communications managed access system of the controlled-environment facility and the electromagnetic signals are received by a software-defined radio associated with the managed access system central access point tuned to monitor for drone control signals.

3. The system of claim 1, wherein the electromagnetic signals are radio frequency signals in a band capable of controlling drones.

4. The system of claim 1, wherein the electromagnetic signals are radio frequency signals in a band associated with drones.

5. The system of claim 1, wherein the electromagnetic signals are radio frequency signals in a band licensed for controlling drones.

6. The system of claim 1, wherein the boundaries associated with the controlled-environment facility extend beyond property boundaries of the controlled-environment facility.

7. The system of claim 6, wherein the analysis module further determines whether the received and monitored electromagnetic signals are directing the drone toward the controlled-environment facility.

8. The system of claim 1, wherein the central access point is further configured to receive and monitor electromagnetic signals originating from a predefined area extending beyond the boundaries associated with the controlled-environment facility.

9. The system of claim 1, wherein the drone response module is further configured to take drone countermeasures in response to the analysis module determining that received and monitored electromagnetic signals are drone control signals.

10. The system of claim 9 wherein the drone countermeasures comprise alerting authorities to the drone being in a vicinity of the controlled-environment facility, approaching the controlled-environment facility, and/or being over the controlled-environment facility.

11. The system of claim 9 wherein the drone countermeasures comprise jamming the drone control signals.

12. The system of claim 9 wherein the drone countermeasures comprise co-opting control of the drone.

13. The system of claim 9 wherein the drone countermeasures comprise monitoring the drone control signals.

14. A method comprising:
    monitoring, via a central access point of a wireless communications managed access system of a controlled-environment facility, electromagnetic signals originating within or transiting operational boundaries associated with the controlled-environment facility;
    receiving, via the central access point of the wireless communications managed access system of the controlled-environment facility, the electromagnetic signals originating within or transiting the operational boundaries associated with the controlled-environment facility; and
    analyzing received electromagnetic signals to determine if the received electromagnetic signals are originating from or are controlling a drone toward the controlled-environment facility.

15. The method of claim 14, wherein the monitoring is carried-out by a software-defined radio associated with the central access point of the wireless communications managed access system of the controlled-environment facility and the electromagnetic signals are received by the software-defined radio of the managed access system.

16. The method of claim 14, wherein the monitoring and receiving of electromagnetic signals are carried out in radio frequency bands capable of controlling drones.

17. The method of claim 14, wherein the operational boundaries associated with the controlled-environment facility extend beyond property boundaries of the controlled-environment facility.

18. The method of claim 14, wherein the electromagnetic signals originate from a predefined area extending beyond the operational boundaries associated with the controlled-environment facility.

19. The method of claim 14, further comprising determining whether the received and monitored electromagnetic signals are directing the drone toward the controlled-environment facility.

20. The method of claim 14, further comprising responding to the drone controlled by the drone control signals.

21. The method of claim 20, wherein responding to the drone further comprises alerting authorities to the drone in the vicinity of the controlled-environment facility, approaching the controlled-environment facility, and/or over the controlled-environment facility.

22. The method of claim 20, wherein responding to the drone further comprises jamming the drone control signals.

23. The method of claim 20, wherein responding to the drone further comprises co-opting control of the drone.

24. The method of claim 20, wherein responding to the drone further comprises monitoring the drone control signals.

25. A non-transitory computer-readable storage medium having program instructions stored thereon that, upon execution by a controlled-environment facility managed wireless communication access system, cause the controlled-environment facility managed wireless communication access system to:
    monitor electromagnetic signals in frequency bands capable of controlling drones originating within or transiting operational boundaries associated with a controlled-environment facility using one or more radios associated with a central access point of the controlled-environment facility managed wireless communication access system;
    receive the electromagnetic signals in the frequency bands capable of controlling drones originating within the operational boundaries associated with the controlled-environment facility by the one or more radios;

analyze received electromagnetic signals to determine if the received electromagnetic signals are controlling or originating from a drone to direct the drone toward the controlled-environment facility; and respond to presence of the drone controlled by the drone control signals.

26. The non-transitory computer-readable storage medium of claim 25, wherein the program instructions cause the controlled-environment facility managed wireless communication access system to respond to the presence of the drone by alerting authorities to the drone in the vicinity of the controlled-environment facility, approaching the controlled-environment facility, and/or over the controlled-environment facility.

27. The non-transitory computer-readable storage medium of claim 25, wherein the program instructions cause the controlled-environment facility managed wireless communication access system to respond to the presence of the drone by emitting one or more signals to jam the drone control signals.

28. The non-transitory computer-readable storage medium of claim 25, wherein the program instructions cause the controlled-environment facility managed wireless communication access system to respond to the presence of the drone by transmitting one or more signals to co-opt control of the drone.

29. The non-transitory computer-readable storage medium of claim 25, wherein the program instructions cause the controlled-environment facility managed wireless communication access system to respond to the presence of the drone by monitoring the drone control signals.

\* \* \* \* \*